(12) United States Patent
Laux et al.

(10) Patent No.: US 11,420,494 B2
(45) Date of Patent: Aug. 23, 2022

(54) METHOD FOR OPERATING AN AIR CONDITIONING SYSTEM IN THE VEHICLE INTERIOR OF A MOTOR VEHICLE

(71) Applicant: Mahle International GmbH, Stuttgart (DE)

(72) Inventors: Holger Laux, Dietingen (DE); Oliver Schultze, Stuttgart (DE)

(73) Assignee: Mahle International GmbH

( * ) Notice: Subject to any disclaimer, the term of this patent is extended or adjusted under 35 U.S.C. 154(b) by 29 days.

(21) Appl. No.: 17/018,854

(22) Filed: Sep. 11, 2020

(65) Prior Publication Data

US 2021/0070133 A1     Mar. 11, 2021

(30) Foreign Application Priority Data

Sep. 11, 2019 (DE) ..................... 10 2019 213 861.6

(51) Int. Cl.
*B60H 1/00* (2006.01)
*B60H 1/22* (2006.01)
*B60H 1/26* (2006.01)

(52) U.S. Cl.
CPC ..... *B60H 1/00371* (2013.01); *B60H 1/00021* (2013.01); *B60H 1/00071* (2013.01);
(Continued)

(58) Field of Classification Search
CPC ............ B60H 1/00021; B60H 1/00071; B60H 1/00364; B60H 1/00371; B60H 1/00428;
(Continued)

(56) References Cited

U.S. PATENT DOCUMENTS 3,862,549 A * 1/1975 Fernandes .......... B60H 1/00371
62/419
5,307,645 A * 5/1994 Pannell .............. B60H 1/00364
454/144

(Continued)

FOREIGN PATENT DOCUMENTS

| DE | 10152150 C1 | 1/2003 |
|---|---|---|
| DE | 102010039674 A1 | 3/2012 |
| EP | 1442954 A1 | 8/2004 |

OTHER PUBLICATIONS

English abstract for DE-102010039674.
English abstract for DE-10152150.
English abstract for EP-1442954.

*Primary Examiner* — Marc E Norman
(74) *Attorney, Agent, or Firm* — Fishman Stewart PLLC

(57) ABSTRACT

A method for operating an air conditioning system, which may include a heating device, to condition air in a vehicle interior of a motor vehicle. At least one first air path and at least one second air path may each fluidically communicate with the air conditioning system and each open out into the vehicle interior. The method may include guiding the air from the vehicle interior via one of (i) the at least one first air path and (ii) the at least one second air path to the air conditioning system as a function of an operating state set in the air conditioning system. The method may also include guiding the air from the air conditioning system via the other of the one of (i) the at least one first air path and (ii) the at least one second air path into the vehicle interior.

19 Claims, 2 Drawing Sheets

(52) U.S. Cl.
CPC ..... *B60H 1/00428* (2013.01); *B60H 1/00485* (2013.01); *B60H 1/00642* (2013.01); *B60H 1/2215* (2013.01); *B60H 1/26* (2013.01); *B60H 2001/00128* (2013.01); *B60H 2001/00178* (2013.01); *B60H 2001/00185* (2013.01)

(58) Field of Classification Search
CPC .. B60H 1/00485; B60H 1/00642; B60H 1/26; B60H 2001/00185; F25D 11/003
See application file for complete search history.

(56) References Cited

U.S. PATENT DOCUMENTS

| | | | | |
|---|---|---|---|---|
| 7,845,184 | B2* | 12/2010 | Tanaka | F25D 17/005 |
| | | | | 62/186 |
| 8,568,209 | B2* | 10/2013 | Boxum | B60H 1/247 |
| | | | | 454/137 |
| 2018/0208013 | A1* | 7/2018 | Trutnovsky | B60H 1/00371 |

* cited by examiner

METHOD FOR OPERATING AN AIR CONDITIONING SYSTEM IN THE VEHICLE INTERIOR OF A MOTOR VEHICLE

CROSS-REFERENCE TO RELATED APPLICATIONS

This application claims priority to German Patent Application No. DE 10 2019 213 861.6, filed on Sep. 11, 2019, the contents of which is hereby incorporated by reference in its entirety.

TECHNICAL FIELD

The invention relates to a method for operating an air conditioning system in the vehicle interior of a motor vehicle. The invention further relates to a motor vehicle comprising an air conditioning system, which is set up/programmed for carrying out this method.

BACKGROUND

Air conditioning devices comprising an integrated heater, which are known to the person of skill in the art under the abbreviation "HVAC", are often used to air-condition vehicle interiors of motor vehicles. The term "air conditioning system" will also be used hereinafter.

For efficiency reasons, an air conditioning system is often operated in the so-called recirculating air mode, in the case of which no fresh air from the external environment of the motor vehicle is introduced into the vehicle interior. Air, which is already present in the vehicle interior, is instead guided from the vehicle interior into the air conditioning system, is air-conditioned there, in particular temperature-controlled, and is subsequently introduced into the vehicle interior again.

It thereby often proves to be problematic that the air conditioning system draws air from the vehicle interior in a diffuse manner. As a result, air flows through the vehicle interior only in a suboptimal manner.

So-called fluidic short-circuits can also occur in the vehicle interior. This applies in particular when an air outlet, via which air arriving from the air conditioning system is introduced into the vehicle interior, and an air outlet, via which air is guided from the vehicle interior to the air conditioning system, are located spatially close to one another. It is possible in this case that air, which is air-conditioned by means of the air conditioning system, does not flow through the entire vehicle interior, but only through a very small partial volume thereof. This can be associated with an unwanted temperature stratification inside the vehicle interior. Individual zones can in particular be created, in which the interior temperature deviates from the complementary area of the vehicle interior to the top or bottom. The vehicle passengers often perceive this as being uncomfortable and thus as comfort-diminished. Zones, in which no air exchange takes place, not even with recirculating air, can also exist in the vehicle interior.

SUMMARY

It is an object of the present invention to create an improved method for operating an air conditioning system, in particular in the recirculating air mode, in the case of which the above-mentioned disadvantages are eliminated at least partially, ideally even completely.

This object is solved by means of the subject matter of the independent patent claim(s). Preferred embodiments are subject matter of the dependent patent claim(s).

It is thus the basic idea of the invention to provide two different recirculating air modes in a motor vehicle comprising an air conditioning system, which differ from one another with regard to the flow direction of the recirculating air from the vehicle interior to the air conditioning system, and back again. At least one air path is typically provided in a motor vehicle for the purpose of transporting air from the vehicle interior to the air conditioning system. At least one further air path is provided for the purpose of transporting air from the air conditioning system to the vehicle interior. The method introduced here is based on the idea of transporting air through the air paths not only in the above-described direction of circulation, but also in reverse direction of circulation. In other words, the air path originally set up for transporting the air from the vehicle interior to the air conditioning system is flown through in reverse direction in a special recirculating air mode, so that air is guided from the air conditioning system guides to the vehicle interior. In this special operating state, the air path, which is actually provided for transporting air from the air conditioning system to the vehicle interior, is accordingly likewise flown through in the reverse direction, so that air is guided from the vehicle interior to the air conditioning system.

This measure according to the invention makes it possible to design the flow-through of the vehicle interior with recirculating air to be particularly flexible. In particular a flexible control/regulation of the interior temperature desired in the vehicle interior is possible in this way. It is possible in particular to cool down the vehicle quickly by means of the air conditioning system in the case of high outside temperatures, and to heat it up quickly by means of the air conditioning system in the case of low ambient or outside temperatures, respectively. The formation of zones in the vehicle interior, which are not subject to being flown through with air or recirculating air, respectively, and which can thus also be temperature-controlled only insufficiently, is in particular avoided. This has a comfort-enhancing effect on the vehicle passengers located in the vehicle interior.

The method according to the invention serves to operate an air conditioning system in the vehicle interior of a motor vehicle, wherein at least a first air path and at least a second air path open out into the vehicle interior. Both air paths fluidically communicate with the air conditioning system. In other words, the two air paths fluidically connect, independently of one another, the vehicle interior to the air conditioning system. According to the method, air from the vehicle interior is guided via the at least one first air path to the air conditioning system as a function of an operating state set in the air conditioning system, and is guided via the at least one second air path from the air conditioning system into the vehicle interior, or vice versa. In said reverse case, air is thus guided from the vehicle interior via the at least one second air path to the air conditioning system, and is guided via the at least one first air path from the air conditioning system into the vehicle interior. Both cases thus describe the circulation of air in the motor vehicle, namely from the vehicle interior to the air conditioning system, and back again. Two directions of circulation of the air, which are opposite to one another, are thus possible between vehicle interior and air conditioning system. Two different operating states of the air conditioning system are defined by the two directions of circulation. Due to the fact that no fresh air is introduced via the air conditioning system from the external environment of the motor vehicle into the vehicle interior in both cases, both operating states are recirculating air operating states of the air conditioning system.

The at least one first air path and the at least one second air path can be formed by suitable air ducts, which are present in the motor vehicle.

To guide air through the first or second air path, respectively, the air conditioning system can be equipped with a fan device (not shown). Said fan device is advantageously formed in such a way that air is drawn through the at least one first air path from the vehicle interior into the air conditioning system or is blown in the reverse direction from the air conditioning system into the vehicle interior by means of negative or positive pressure generation. Said fan device can advantageously also be formed in such a way that air is drawn through the at least one second air path from the vehicle interior into the air conditioning system or is blown in the reverse direction from the air conditioning system into the vehicle interior by means of negative or positive pressure generation.

According to a preferred embodiment, air is guided in a first operating state of the air conditioning system from the vehicle interior via the at least one first air path to the air conditioning system, is cooled by the latter, and is then guided back into the vehicle interior again via the second air path. To cool the air, which flows through the air conditioning system, the air conditioning system can have a conventional cooling unit comprising a compressor and comprising a condenser. The exact technical setup of a conventional cooling unit of this type is known to the pertinent person of skill in the art in the field of climate control technology, so that more precise explanations with regard to this can be forgone. The first operating state can in particular be used to cool down the vehicle interior quickly and effectively, in particular in the case of high outside temperatures.

According to a further preferred embodiment, which can in particular be combined with the above-described embodiment, air is guided in a second operating state of the air conditioning system from the vehicle interior via the at least one second air path to the air conditioning system, is heated up by the latter, and is then guided back into the vehicle interior again via the at least one first air path. The second operating state is especially suitable to heat up the vehicle interior quickly and effectively, in particular in the case of low outside temperatures.

According to an advantageous further development, the air guided through the air conditioning system is heated in the second operating state by means of an electrical heating device provided in the air conditioning system, so that the heated air can be introduced into the vehicle interior via the at least one first air path. The vehicle interior can thus be heated up quickly even in the case of low temperatures.

The electrical heating device can advantageously be deactivated in the first operating state, so that it does not heat any air, which flows through the air conditioning system. In the first operating state, the vehicle interior can thus be cooled quickly and effectively by corresponding flow-through with non-heated air.

According to an advantageous further development, the at least one first air path opens out into the vehicle interior in at least one first opening point, which is arranged in the vehicle interior above at least one second opening point, in which the at least one second air path opens out into the vehicle interior. In both operating states, a flow-through of the vehicle interior with air can thus be attained in the vertical direction, either from top to bottom or, in the alternative, from bottom to top.

The at least one second opening point is particularly preferably arranged in the area of a foot or floor space of the vehicle interior. This makes it possible to introduce air from the air conditioning system into this area of the vehicle interior or to discharge it from this area, depending on the operating state set in the air conditioning system. In the case of this preferred embodiment, the at least one first opening point is moreover arranged in an area above the second opening point in the vehicle interior. This makes it possible to discharge air from this area of the vehicle interior or to supply this area with air from the air conditioning system, depending on the operating state set in the air conditioning system.

A recirculating air connection and a fresh air connection are advantageously present at the air conditioning system, wherein the fresh air connection fluidically communicates with an external environment of the motor vehicle in order to introduce fresh air into the vehicle interior. In the case of this embodiment, the at least one first air path fluidically communicates with the recirculating air connection, and the at least one second air path fluidically communicates with the fresh air connection in the first operating state of the air conditioning system. In the case of this embodiment, the at least one first air path furthermore fluidically communicates with the fresh air connection, and the at least one second air path fluidically communicates with the recirculating air connection in the second operating state of the air conditioning system.

According to an advantageous further development of the method according to the invention, fresh air from the external environment of the motor vehicle is not supplied to the vehicle interior via the air conditioning system in the first operating state. In the alternative or in addition, fresh air from the external environment of the motor vehicle is also not supplied to the vehicle interior via the air conditioning system in the second operating state.

The invention moreover relates to a motor vehicle comprising a vehicle interior and comprising an air conditioning system for air-conditioning the vehicle interior. The air conditioning system is preferably set up/programmed for carrying out the above-introduced method according to the invention. The above-described advantages of the method according to the invention, including its preferred embodiments, also transfer to the motor vehicle according to the invention in this case.

The motor vehicle according to the invention comprises at least one first and at least one second air path, both of which fluidically connect the air conditioning system to the vehicle interior. The at least one first air path thereby opens out into the vehicle interior in at least one first opening point. The at least one second air path opens out into the vehicle interior in at least one second opening point. The motor vehicle further comprises a recirculating air connection, which is present at the air conditioning system, and a fresh air connection, which is present at the air conditioning system. The fresh air connection thereby fluidically communicates with an external environment of the motor vehicle in order to introduce fresh air into the vehicle interior via the air conditioning system. For this purpose, a suitable fresh air line can be provided in the motor vehicle, which fluidically connects the external environment of the motor vehicle to the air conditioning system. This preferably applies only for the fresh air connection, thus expressly not for the recirculating air connection in this case.

The air conditioning system and the air paths are formed in such a way that the first air path optionally fluidically communicates with the recirculating air connection, and the second air path fluidically communicates with the fresh air connection, or the first air path fluidically communicates with the fresh air connection, and the second air path fluidically communicates with the recirculating air connection.

This property of the air conditioning system, which is essential for the invention, makes it possible to design the flow-through of the vehicle interior with recirculating air in a particularly flexible manner. In particular a flexible control of the interior temperature desired in the vehicle interior is possible in this way. It is possible in particular to cool down the vehicle quickly by means of the air conditioning system in the case of high ambient or outside temperatures, respectively, and to heat it up quickly by means of the electrical heating device, which is integrated in the air conditioning system or which interacts with the latter, in the case of low ambient or outside temperatures, respectively.

Reference is in particular made to the formation of zones in the vehicle interior, which are not subject to the flow-through with air or recirculating air, respectively, and which can thus also be temperature-controlled only insufficiently. This has a comfort-enhancing effect on the vehicle passengers located in the vehicle interior.

According to a preferred embodiment, the motor vehicle comprises a valve device, which can be adjusted between a first and a second setting. In the first setting, the first air path fluidically communicates with the recirculating air connection, and the second air path fluidically communicates with the fresh air connection. In the second setting, the first air path fluidically communicates with the fresh air connection, and the second air path fluidically communicates with the recirculating air connection. This embodiment allows for a simple switch-over of the air conditioning system between the above-mentioned two recirculating operating states.

According to a preferred embodiment, the valve device is formed as multi-way valve, particularly preferably as four-way valve.

According to an advantageous further development, the motor vehicle comprises a control/regulating device, which controls the air conditioning system and the valve device during operation. In a first operating state of the air conditioning system, the control/regulating device thereby sets the first setting in the valve device, and sets the second setting in a second operating state.

Particularly preferably, the air conditioning system comprises an electrical heating device, which can be controlled by means of the control/regulating device. The heating device and the control/regulating device are preferably set up and adapted to one another in such a way that the control/regulating device activates the heating device in the second operating state, so that the air, which flows through the air conditioning system, is heated, and deactivates it in the first operating state, so that the air, which flows through the air conditioning system, is not heated. The first operating state can in particular be used to quickly and efficiently cool down the vehicle interior, in particular in the case of high outside temperatures. The second operating state is particularly well suited to quickly and efficiently heat up the vehicle interior, in particular in the case of low outside temperatures.

According to an advantageous further development, the at least one first opening point is arranged in the area of a foot or floor space of the vehicle interior. In the alternative or in addition, the at least one second opening point is arranged in the area above the at least one second opening point in the vehicle interior in the case of this further development. A comprehensive flow-through of the vehicle interior with air is ensured in this way.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
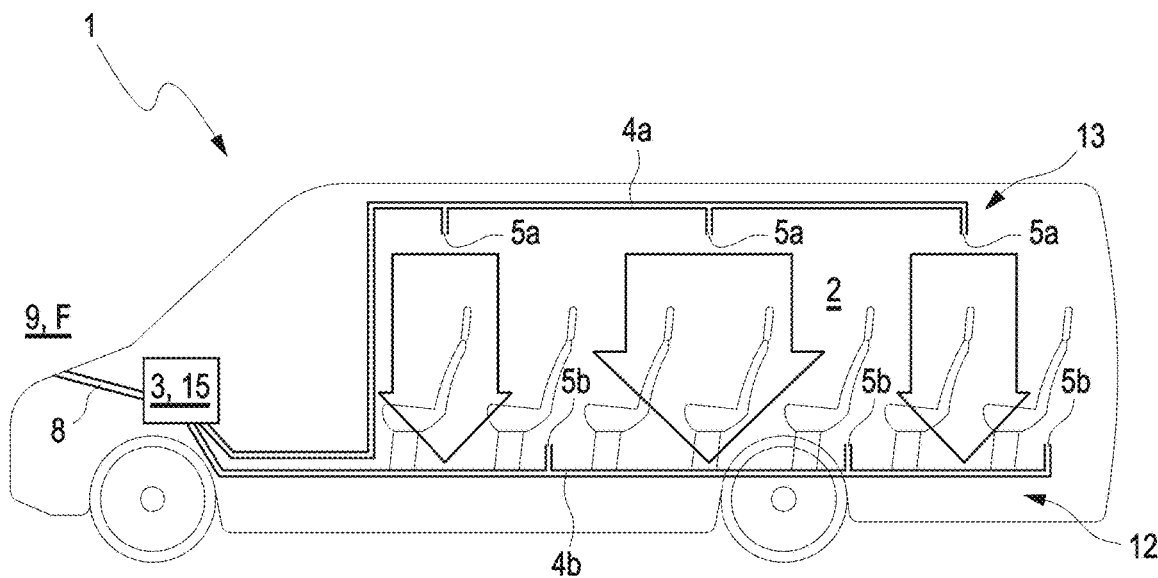
FIG. 1 shows an example of a motor vehicle according to the invention.

In simplified illustration, FIG. 1 shows an example of a motor vehicle 1 according to the invention. The motor vehicle 1 comprises a vehicle interior 2. The motor vehicle 1 moreover has an air conditioning system 3 for air-conditioning the vehicle interior 2.

Figure 2:
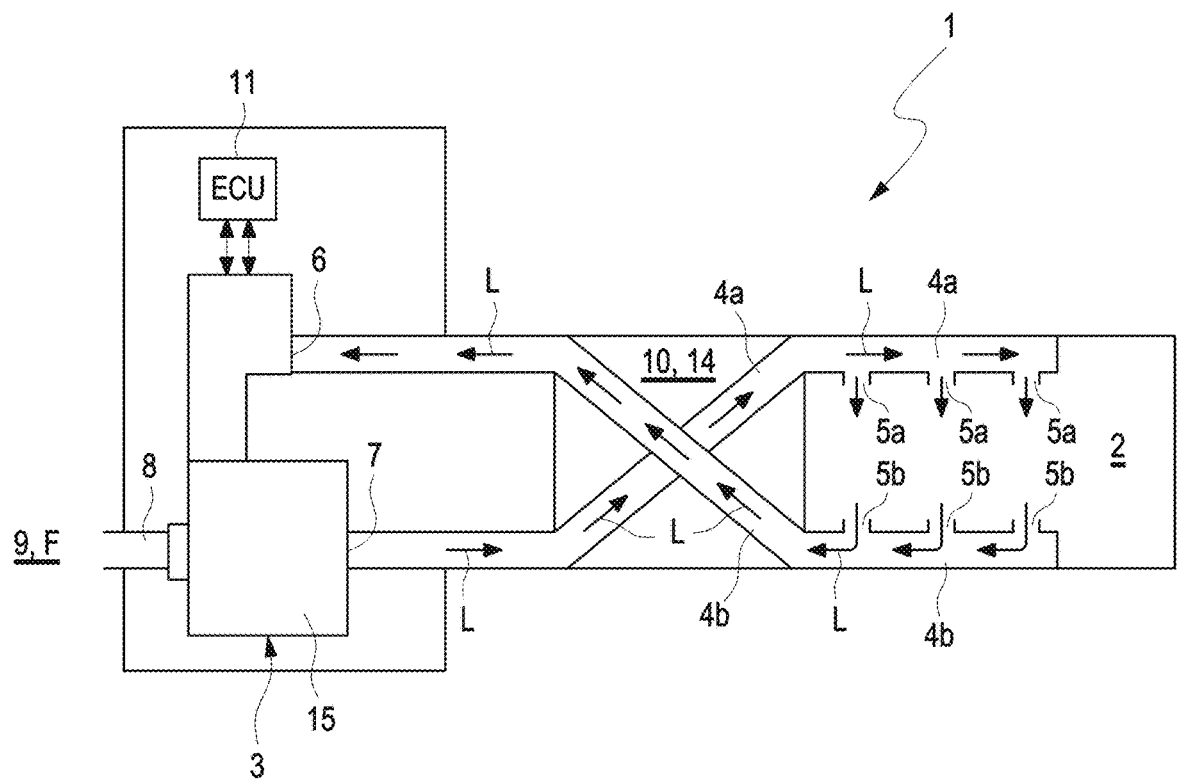
FIG. 2 shows the motor vehicle of FIG. 1 having a valve device being set to a second setting.

It can be gathered from the schematic illustration of FIG. 2 that a first air path 4a and a second air path 4b are provided in the motor vehicle 1. Both air paths 4a, 4b fluidically connect the air conditioning system 3 to the vehicle interior 2. The first air path 4a thereby opens out into the vehicle interior 2 in three first opening points 5a. The second air path 4b opens out into the vehicle interior 2 in three different second opening points 5b. In variations of the example, the number of the first opening points 5a as well as the number of the second opening points 5b can vary.

The second opening points 5b are arranged in the area 12 of a foot or floor space of the vehicle interior 2. The first opening points 5a are arranged in an area 13 of the vehicle interior 2, which is arranged above the area 12.

A recirculating air connection 6 and a fresh air connection 7 are provided at the air conditioning system 3. The fresh air connection 7, but not the recirculating air connection 6, fluidically communicates with an external environment 9 of the motor vehicle 1 via a fresh air path 8. A suitable fresh air duct, which fluidically connects the external environment 9 of the motor vehicle 1 to the air conditioning system 3, can be provided for this purpose. Fresh air F from the external environment 9 can thus be supplied to the air conditioning system 3.

To guide air L through the first or second air path 4a, 4b, respectively, the air conditioning system 3 can be equipped with a fan device (not shown). Said fan device is formed in such a way that air L is drawn through the at least one first air path 4a from the vehicle interior 2 into the air conditioning system 3 or is pushed in the reverse direction from the air conditioning system 3 into the vehicle interior 2 by means of negative or positive pressure generation. Said fan device is advantageously also formed in such a way that air L is pushed through the at least one second air path 4b from the air conditioning system 3 into the vehicle interior 2 or is drawn in the reverse direction from the vehicle interior 2 into the air conditioning system 3 by means of negative or positive pressure generation. To control the temperature of the vehicle interior 2, the air conditioning system 3 can be equipped with an electrical heating device 15, which heats the air L, which flows through the air conditioning system 3.

As illustrated in FIG. 2, an adjustable valve device 10 is present in the motor vehicle 1. Said valve device can be adjusted between a first setting and a second setting, wherein in FIGS. 1 and 2, the valve device 10 (shown only in FIG. 2 for the sake of clarity) is in the second setting. In the second setting, the valve device 10 fluidically connects the first air path 4a to the fresh air connection 7 of the air conditioning system 3. The valve device 10 furthermore fluidically connects the second air path 4b to the recirculating air connection 6 of the air conditioning system 3. The valve device 10 is preferably formed as multi-way valve 14, particularly preferably as four-way valve.

Figure 3:
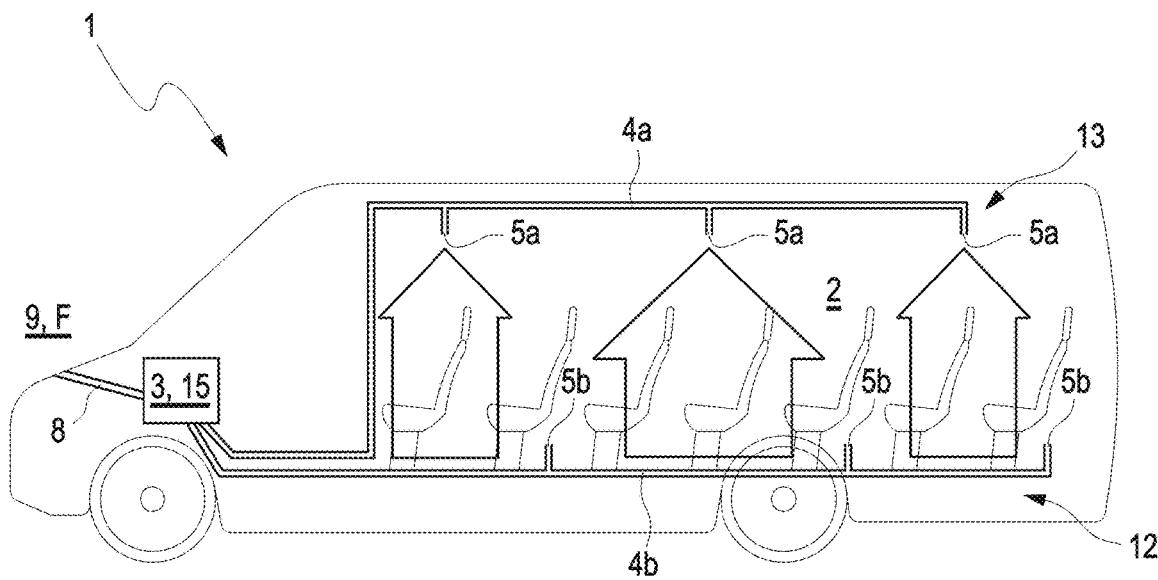
FIGS. 3 and 4 show the motor vehicle of FIG. 1 having a valve device being set to a first setting.
Figure 4:
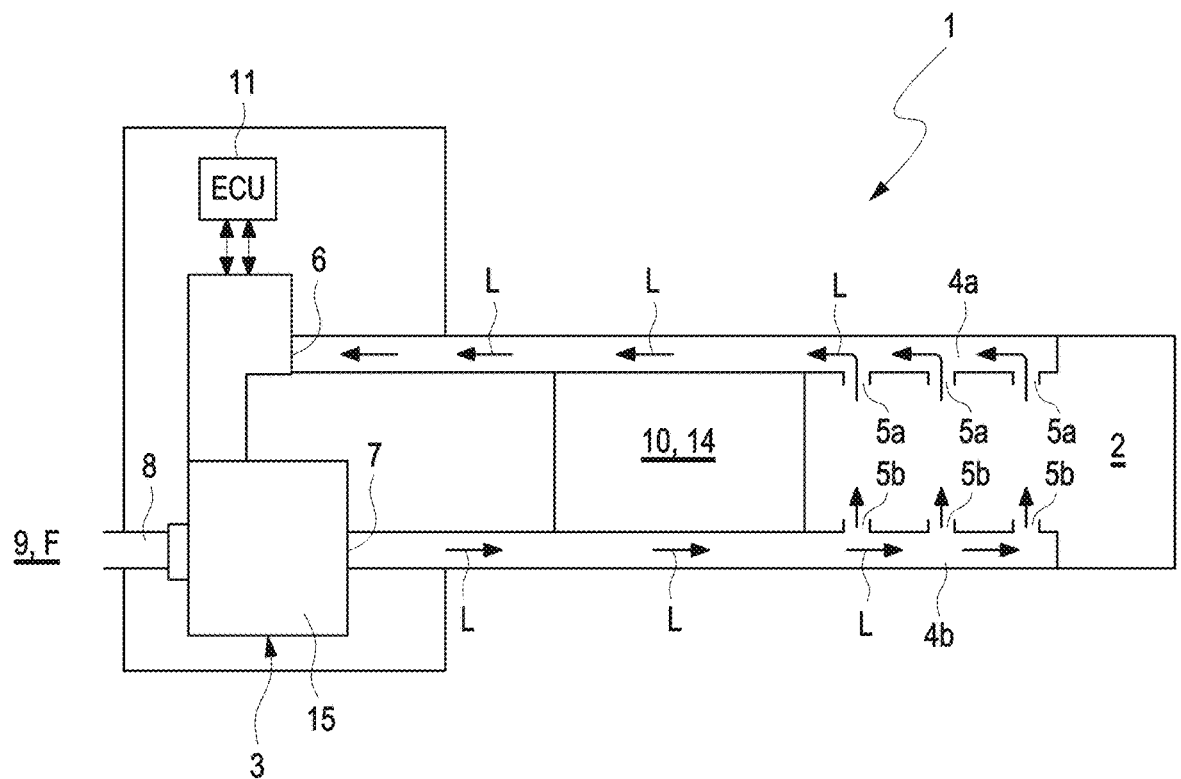

In contrast, FIGS. 3 and 4 show the valve device 10 in the first setting. In this setting, the valve device 10 fluidically connects the second air path 4b to the fresh air connection 7. Moreover, the valve device 10 fluidically connects the first air path 4a to the recirculating air connection 6. The air conditioning system 3 and the two air paths 4a, 4b of the motor vehicle 1 are thus formed in such a way with the help of the valve device 10 that the first air path 4a optionally fluidically communicates with the recirculating air connection 6 and the second air path 4b simultaneously fluidically communicates with the fresh air connection 7, or, in the alternative, the first air path 4a fluidically communicates with the fresh air connection 7, and the second air path 4b simultaneously fluidically communicates with the recirculating air connection 6.

At least two different operating states can be set in the air conditioning system 3 or in the motor vehicle 1, respectively, with the help of the valve device 10. In a first operating state of the air conditioning system 3, the control/regulating device 11 sets the first setting in the valve device 10. In a second operating state of the air conditioning system 3, the control/regulating device 11 sets the second setting in the valve device 10.

The method according to the invention, which will be described below, can be carried out in the motor vehicle 1 or in the air conditioning system 3, respectively. When carrying out the method, air L is guided from the vehicle interior 2 via the first air path 4a to the air conditioning system 3 as a function of an operating state set in the air conditioning system 3, and is guided via the second air path 4b from the air conditioning system 3 into the vehicle interior 2, or vice versa. The two variations thus differ with regard to the direction of circulation of the air in the two air paths 4a, 4b. In a first operating state, air L is guided from the vehicle interior 2 via the first air path 4a via the recirculating air connection 6 into the air conditioning system 3, is cooled in the latter, and is then guided back into the vehicle interior 2 again via the fresh air connection 7, the second air path 4b, and via the second opening point 5b. In the first operating state, a cooling unit of the air conditioning system 3 can be activated, which cools down the air L, which is guided through the air conditioning system 3.

In a second operating state, which differs from the first operating state, air L is guided from the vehicle interior 2 via the second air path 4b and via the recirculating air connection 6 into the air conditioning system 3, is heated up in the latter, and is then guided back into the vehicle interior 2 again via the fresh air connection 7, via the first air path 4a, and via the first opening point 5a. In the second operating state, the air L, which is guided through the air conditioning system 3, is heated by means of an electrical heating device 15 provided in the air conditioning system 3, so that heated air L is introduced into the vehicle interior 2 via the at least one first air path 4a. In contrast, the electrical heating device 15 is deactivated in the first operating state, so that it does not heat any air L, which is through the air conditioning system 3.

The first and also the second operating state advantageously realize a recirculating air mode in the motor vehicle. This means that in the first as well as second operating state, no fresh air F from the external environment 9 of the motor vehicle 1 is introduced into the vehicle interior 2 via the air conditioning system 3.

The invention claimed is:

1. A method for operating an air conditioning system, which includes a heater, to condition air in a vehicle interior of a motor vehicle, wherein at least one first air path and at least one second air path each fluidically communicate with the air conditioning system and each open out into the vehicle interior, the method comprising:
   guiding the air from the vehicle interior via one of (i) the at least one first air path and (ii) the at least one second air path to the air conditioning system as a function of an operating state set in the air conditioning system;
   guiding the air from the air conditioning system via the other of the one of (i) the at least one first air path and (ii) the at least one second air path into the vehicle interior;
   when in a first operating state of the air conditioning system, (i) guiding the air from the vehicle interior via the at least one first air path to the air conditioning system, (ii) cooling the guided air via the air conditioning system, and (iii) guiding the cooled air back into the vehicle interior via the at least one second air path; and
   when in a second operating state of the air conditioning system, (i) guiding the air from the vehicle interior via the at least one second air path to the air conditioning system, (ii) heating up the guided air via the air conditioning system, and (iii) guiding the heated air back into the vehicle interior via the at least one first air path.

2. The method according to claim 1, further comprising, when in an operating state of the air conditioning system:
   guiding the air from the vehicle interior via the at least one first air path to the air conditioning system;
   cooling the guided air via the air conditioning system; and
   guiding the cooled air back into the vehicle interior via the at least one second air path.

3. The method according to claim 2, wherein the air conditioning system further includes a recirculating air connection and a fresh air connection, the fresh air connection in fluidical communication with an external environment of the motor vehicle to introduce fresh air into the vehicle interior, the method further comprising:
   when in the first operating state, establishing fluidical communication (i) between the at least one first air path and the recirculating air connection and (ii) between the at least one second air path and the fresh air connection; and
   when in a second operating state, establishing fluidical communication (i) between the at least one first air path and the fresh air connection and (ii) between the at least one second air path and the recirculating air connection.

4. The method according to claim 3, further comprising at least one of:
- refraining from supplying the fresh air from the external environment to the vehicle interior via the air conditioning system when in the first operating state; and
- refraining from supplying the fresh air from the external environment to the vehicle interior via the air conditioning system when in the second operating state.

5. The method according to claim 3, further comprising:
- refraining from supplying the fresh air from the external environment to the vehicle interior via the air conditioning system when in the first operating state; and
- refraining from supplying the fresh air from the external environment to the vehicle interior via the air conditioning system when in the second operating state.

6. The method according to claim 1, further comprising, when in an operating state of the air conditioning system:
- guiding the air from the vehicle interior via the at least one second air path to the air conditioning system;
- heating up the guided air via the air conditioning system; and
- guiding the heated air back into the vehicle interior via the at least one first air path.

7. The method according to claim 6, wherein heating up the guided air includes heating up the guided air with an electrical heater of the air conditioning system.

8. The method according to claim 7, further comprising at least one of deactivating the electrical heater and keeping the electrical heater deactivated when in a second operating state such that the electrical heater does not heat the air flowing through the air conditioning system.

9. The method according to claim 1, further comprising:
- configuring the at least one first air path to open out into the vehicle interior in at least one first opening point, the at least one first opening point arranged in the vehicle interior above at least one second opening point; and
- configuring the at least one second air path to open out into the vehicle interior in the at least one second opening point.

10. The method according to claim 9, further comprising at least one of:
- arranging the at least one second opening point in an area of at least one of (i) a foot space of the vehicle interior and (ii) a floor space of the vehicle interior; and
- arranging the at least one first opening point in an area above the at least one second opening point in the vehicle interior.

11. The method according to claim 9, further comprising:
- arranging the at least one second opening point in an area of at least one of (i) a foot space of the vehicle interior and (ii) a floor space of the vehicle interior; and
- arranging the at least one first opening point in an area above the at least one second opening point in the vehicle interior.

12. The method according to claim 1, further comprising:
- adjusting a valve of the motor vehicle to a first setting such that (i) the at least one first air path fluidically communicates with a recirculating air connection and (ii) the at least one second air path fluidically communicates with a fresh air connection; and
- adjusting the valve to a second setting such that (i) the at least one first air path fluidically communicates with the fresh air connection and (ii) the at least one second air path fluidically communicates with the recirculating air connection;

wherein the fresh air connection is in fluidical communication with an external environment of the motor vehicle.

13. The method according to claim 12, wherein:
- adjusting the valve to the first setting includes adjusting the valve to the first setting via a controller of the motor vehicle when the air conditioning system is in the first operating state; and
- adjusting the valve to the second setting includes adjusting the valve to the second setting via the controller when the air conditioning system is in the second operating state.

14. The method according to claim 13, further comprising:
- activating a heater of the air conditioning system via the controller when the air condition system is in the second operating state such that the air flowing through the air conditioning system is heated; and
- deactivating the heater via the controller when the air condition system is in the first operating state such that the air flowing through the air conditioning system is not heated.

15. A motor vehicle, comprising:
- a vehicle interior;
- an air conditioning system for air-conditioning the vehicle interior;
- at least one first and at least one second air path each of which fluidically connect the air conditioning system to the vehicle interior, the at least one first air path opening out into the vehicle interior in at least one first opening point, and the at least one second air path opening out into the vehicle interior in at least one second opening point;
- a recirculating air connection disposed at the air conditioning system;
- a valve;
- a fresh air connection disposed at the air conditioning system, the fresh air connection in fluidical communication with an external environment of the motor vehicle to introduce fresh air from the external environment into the vehicle interior;
- wherein the at least one first air path fluidically communicates with one of (i) the recirculating air connection and (ii) the fresh air connection, and the at least one second air path fluidically communicates with the other of the one of (i) the recirculating air connection and (ii) the fresh air connection; and
- wherein the valve is adjustable between a first setting, in which the at least one first air path fluidically communicates with the recirculating air connection and the at least one second air path fluidically communicates with the fresh air connection, and a second setting, in which the at least one first air path fluidically communicates with the fresh air connection and the at least one second air path fluidically communicates with the recirculating air connection.

16. The motor vehicle according to claim 15, further comprising:
- controller configured to control the air conditioning system and the valve; and
- wherein the controller is configured to adjust the valve to (i) the first setting when the air conditioning system is in a first operating state and (ii) the second setting when the air conditioning system is in a second operating state.

17. The motor vehicle according to claim 16, wherein:
the air conditioning system includes an electrical heater controllable via the controller; and
the heater and the controller are set up and adapted to one another such that the controller (i) activates the heater when the air conditioning system is in the second operating state such that the air flowing through the air conditioning system is heated, and (ii) deactivates the heater when the air conditioning system is in the first operating state such that the air flowing through the air conditioning system is not heated.

18. The motor vehicle according to claim 15, wherein at least one of:
the at least one second opening point is arranged in an area of at least one of (i) a foot space of the vehicle interior and (ii) a floor space of the vehicle interior; and
the at least one first opening point is arranged in an area above the at least one second opening point in the vehicle interior.

19. A method for operating an air conditioning system to condition air in a vehicle interior of a motor vehicle, the air conditioning system including a heater, a recirculating air connection, and a fresh air connection, the fresh air connection in fluidical communication with an external environment of the motor vehicle to introduce fresh air into the vehicle interior, wherein at least one first air path and at least one second air path each fluidically communicate with the air conditioning system and each open out into the vehicle interior, the method comprising:

guiding the air from the vehicle interior via one of (i) the at least one first air path and (ii) the at least one second air path to the air conditioning system as a function of an operating state set in the air conditioning system;

guiding the air from the air conditioning system via the other of the one of (i) the at least one first air path and (ii) the at least one second air path into the vehicle interior;

when in a first operating state of the air conditioning system:
guiding the air from the vehicle interior via the at least one first air path to the air conditioning system;
cooling the guided air via the air conditioning system;
guiding the cooled air back into the vehicle interior via the at least one second air path;
establishing fluidical communication between the at least one first air path and the recirculating air connection; and
establishing fluidical communication between the at least one second air path and the fresh air connection;

when in a second operating state of the air conditioning system:
establishing fluidical communication between the at least one first air path and the fresh air connection; and
establishing fluidical communication between the at least one second air path and the recirculating air connection.

* * * * *